US008305253B1

(12) United States Patent
Hershkowitz

(10) Patent No.: US 8,305,253 B1
(45) Date of Patent: Nov. 6, 2012

(54) FORWARD-LOOKING SYNTHETIC APERTURE RADAR PROCESSING

(75) Inventor: Stephen J. Hershkowitz, Manhattan Beach, CA (US)

(73) Assignee: MARK Resources, Inc., Torrance, CA (US)

(*) Notice: Subject to any disclaimer, the term of this patent is extended or adjusted under 35 U.S.C. 154(b) by 0 days.

(21) Appl. No.: 12/913,496

(22) Filed: Oct. 27, 2010

(51) Int. Cl.
*G01S 13/00* (2006.01)
(52) U.S. Cl. .................................. 342/25 A; 342/29
(58) Field of Classification Search ............. 342/25, 342/29
See application file for complete search history.

(56) References Cited

U.S. PATENT DOCUMENTS 7,242,343 B1 * 7/2007 Woodell ................. 342/26 B

OTHER PUBLICATIONS

Cadalli, Nail , et al., "A Comparison of ω-κ and Generalized SAR Inversion for Runway Imaging", *Proc. IEEE Int. Conf. Image Processing*, Vancouver, BC, Canada, (Sep. 10-13, 2000), pp. 693-696.
Cadalli, Nail , et al., "A Simulation Study of the ω-κ SAR Algorithm for the Highly Squinted Case with Application to Runway Imaging", *Proc. IEEE Int. Conf. Acoust., Speech, Signal Processing*, Instanbul, Turkey, (Jun. 5-9, 2000), pp. 3025-3028.
Carrara, Walter G., et al., "Spotlight Synthetic Aperture Radar", Artech House, Inc. Publishers, (1995), pp. 81-155, 401-471, 495-499.
Cumming, Ian G., et al., "Digital Processing of Synthetic Aperture Radar Data", Artech House, Inc. Publishers, (2005), pp. 225-367.
Esa, Sarmap, Unesco Bilko, "Synthetic Aperture Radar Land Applications Tutorial", (2005), 63 pages total.
Jakowatz, Jr., Charles V., et al., "Spotlight-Mode Synthetic Aperture Radar: A Signal Processing Approach", Kluwer Academic Publishers, (1996), pp. 33-103.
Perry, R. P., et al., "SAR Imaging of Moving Targets", *IEEE Transctions on Aerospace and Electronic Systems*, vol. 35, No. 1, (Jan. 1999), pp. 188-199.
Soumekh, Mehrdad , "Fourier Array Imaging", Prentice Hall Publishers, (1994), pp. 352-439.
Soumekh, Mehrdad , "Synthetic Aperture Radar Signal Processing with MATLAB Algorithms", John Wiley & Sons, Inc. Publishers, (1999), pp. 176-261, 465-477.
Zhu, Daiyin , et al., "A Keystone Transform Without Interpolation for SAR Ground Moving-Target Imaging", *IEEE Geoscience and Remote Sensing Letters*, vol. 4, No. 1, (Jan. 2007), pp. 18-22.

* cited by examiner

*Primary Examiner* — Timothy A Brainard
(74) *Attorney, Agent, or Firm* — Blakely Sokoloff Taylor & Zafman LLP

(57) ABSTRACT

Processing is described for forming a synthetic aperture radar image of the region toward which a platform moves, and for extracting from this image the physical positions of scatterers in the region, including moving scatterers. The processing entails one-dimensional resampling of the received radar data that can be performed as the data are being collected, facilitating real-time operation. Various embodiments are disclosed.

39 Claims, 2 Drawing Sheets

FORWARD-LOOKING SYNTHETIC APERTURE RADAR PROCESSING

STATEMENT OF GOVERNMENT INTEREST

The U.S. Government has certain rights in this invention pursuant to Contract No. FA8651-07-M-0184 awarded by the Air Force.

BACKGROUND OF THE INVENTION

1. Field of the Invention

The present invention relates to the fields of synthetic aperture radar, fuze radar, collision avoidance radar, and precision approach and landing radar.

2. Prior Art

Synthetic Aperture Radar (SAR) uses a series of radar pulses transmitted and received over time from a moving platform to create a range-crossrange image. The bandwidth of the radar provides range resolution and the angular rotation of the radar line of sight with respect to the scene to be imaged provides crossrange resolution. The formation of a perfectly focused image requires accounting for the time-varying range to each point in the scene, which variation differs from point to point. Most widely used SAR image formation algorithms (Polar Format Algorithm, Range Doppler Algorithm, Chirp Scaling Algorithm, Back Projection Algorithm) approximate the range variation in ways that work to varying degrees for side-looking SAR, but work poorly for forward-looking SAR. That is, these algorithms do not provide a well-focused image of the region toward which the platform is moving. (See Carrara, W. G., R. S. Goodman, and R. M. Majewski, *Spotlight Synthetic Aperture Radar: Signal Processing Algorithms*, Artech House, 1995; Cumming, I. G. and F. H. Wong, *Digital Processing of Synthetic Aperture Radar Data: Algorithms and Implementation*, Artech House, 2005; and Jakowatz, C. V., et al., *Spotlight-Mode Synthetic Aperture Radar: A Signal Processing Approach*, Kluwer Academic, 1996.)

Only one of the general approaches to SAR imaging, the Range Migration or Omega-K Algorithm, avoids approximations that are invalid for forming an image of the region toward which the platform is moving. (See Carrara, W. G., R. S. Goodman, and R. M. Majewski, *Spotlight Synthetic Aperture Radar: Signal Processing Algorithms*, Artech House, 1995; Cumming, I. G. and F. H. Wong, *Digital Processing of Synthetic Aperture Radar Data: Algorithms and Implementation*, Artech House, 2005; and Soumekh, M., *Synthetic Aperture Radar Signal Processing with MATLAB Algorithms*, John Wiley & Sons, 1999.) General descriptions of this algorithm assert that it applies for any squint angle, but the signal and image processing literature indicates that when it is implemented for high squint angles (forward-looking) it may in practice produce responses that are aberrated, wide, or shifted from their true locations. (See Cadalli, N. and D. C. Munson Jr., "A Simulation Study of the ω-k SAR Algorithm for the Highly Squinted Case with Application to Runway Imaging", Proc. IEEE Int. Conf. Acoust., Speech, Signal Processing, Istanbul, Turkey, Jun. 5-9, 2000, vol. 5, pp. 3025-3028; and Cadalli, N. and D. C. Munson Jr., "A comparison of ω-k and generalized SAR inversion for runway imaging", Proc. IEEE Int. Conf. Image Processing, Vancouver, BC, Canada, Sep. 10-13, 2000, vol. 1, pp. 693-696.) Moreover, the algorithm requires a time-consuming processing step (Stolt interpolation) that cannot be executed until all the data used to form the image have been collected, which makes the algorithm poorly suited for use in real time by fast-moving platforms; data collection must cease at such a long range from an object to be imaged that only crude crossrange resolution can be obtained. Approximate versions of the Omega-K Algorithm replace Stolt interpolation with a faster step, but this replacement works poorly for forward-looking SAR (see Cumming, I. G. and F. H. Wong, *Digital Processing of Synthetic Aperture Radar Data: Algorithms and Implementation*, Artech House, 2005).

DETAILED DESCRIPTION OF THE PREFERRED EMBODIMENTS

Figure 1:
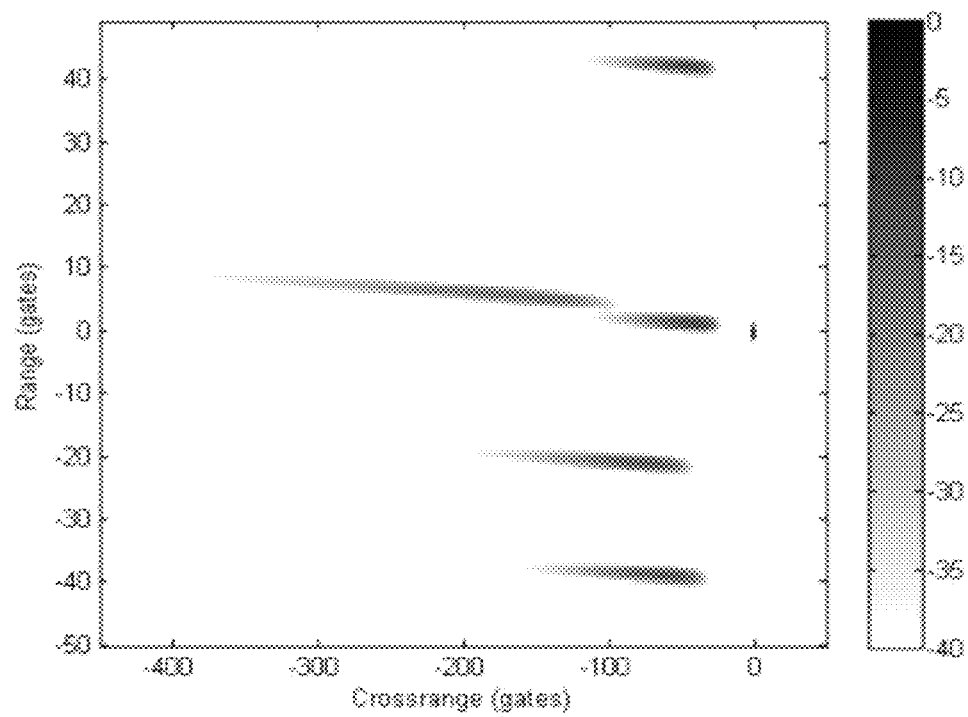
FIG. 1 illustrates an exemplary image formed without the invention, with poorly compressed responses away from the point of motion compensation.

In forward-looking SAR, the width of a nominal Doppler resolution cell is inversely proportional to both the integration time and the distance from the radar trajectory. In order to achieve fine resolution near the trajectory, one must integrate a relatively long time. However, over such long integration times, the Dopplers of scatterers that are far from the trajectory vary enough to smear their image responses over many Doppler resolution cells. These scatterers may also move through range resolution cells during the integration time needed to achieve fine Doppler resolution near the radar trajectory. In principle, matched filtering may be used to accommodate the differential range acceleration of scatterers. In practice, the computation required for matched-filter image formation is too much to be implemented in real time on most platforms.

The preferred embodiments of the present invention are based on an efficient resampling procedure that accommodates the differential range accelerations. The essential element of the resampling is interpolating the collected data so that they are evenly spaced in a new coordinate, the reciprocal of the range to the center of the imaged scene.

To explain the invention, an exemplary embodiment for a radar headed on a constant-speed straight line at a stationary target (including near misses) will be described. The assumption of constant speed is for convenience only; the method works equally well for any motion along a straight line. The method also works for somewhat curved trajectories. Define the z-coordinate to be increasing along the trajectory and the ρ-coordinate to measure linear distance from the trajectory line. As explained below, the z-coordinate is proportional to range in the image and the ρ-coordinate is proportional to the square root of crossrange in the image. Let v be the speed and choose the time origin so t=0 is at the projected time of impact (or closest approach). Note that with this choice, t is negative throughout the image formation process. Also, set z=0 at the projected impact point. Then, the range to a point at (z,ρ) at time t is given by $$R^2 = (z-vt)^2 + \rho^2 \qquad (1)$$

Compensating the motion of the impact point gives a residual range of $$R_c = \sqrt{(z-vt)^2 + \rho^2} + vt \qquad (2)$$

When the distance to the object is much larger than the size of the object (for this exemplary embodiment, when $-vt \gg z$ and $-vt \gg \rho$), a series expansion of (2) gives $$R_c \approx z - \rho^2/(2vt) - \rho^2 z/(2v^2 t^2) \qquad (3)$$

This gives a Doppler of $$v_c \approx -(2/\lambda)[\rho^2/(2vt^2) + \rho^2 z/(v^2 t^3)] \qquad (4)$$

where $\lambda$ is the wavelength corresponding to the carrier frequency of the radar.

The range-acceleration varies throughout the object, per (3) and (4). The invention resamples the data to reduce this variation. To this end, define a new coordinate $\theta = 1/t$ proportional to the reciprocal of the range to the impact point, giving $$R_c \approx z - \theta \rho^2/(2v) - \theta^2 \rho^2 z/(2v^2) \qquad (5)$$

$$\partial R_c/\partial \theta \approx -\rho^2/(2v) - \theta \rho^2 z/v^2 \qquad (6)$$

Next, resample the data (via interpolation) to obtain constant spacing in $\theta$. Then, in an image formed by a Fourier transform over $\theta$, only the last term in (5) or (6) contributes to crossrange smearing. As discussed below, this provides much improved crossrange resolution and response compression.

Although this exemplary embodiment compensates the motion of the impact point, the compensated motion need not be that of a point on the trajectory. Compensation of a point at a distance $\rho_c$ from the trajectory changes (3) through (6) by replacing $\rho^2$ by $\rho^2 - \rho_c^2$, without changing the resampling. As discussed below, the appropriate selection of the point to compensate depends on the application.

Improved Crossrange Resolution

Let T be the duration over which one integrates to form an image, giving Doppler resolution 1/T. Without resampling, the integration time T is limited (approximately) by requiring the Doppler drift of a scatterer to be less than a nominal Doppler resolution cell, expressed by the leading term of (4) as $$(2/\lambda)[P^2/(2v(t-T)^2) - P^2/(2vt^2)] < 1/T \qquad (7)$$

where P is the largest value of $\rho$ on the target. To lowest order in T, this gives $$T < \sqrt{-\lambda v t^3/(2P^2)} \qquad (8)$$

By (4), the corresponding crossrange resolution C in $\rho^2$ is given by $$C > \sqrt{-2\lambda v t P^2} \qquad (9)$$

For the reciprocal-range coordinate $\theta$ the integration interval $\Theta$ is again limited approximately by requiring the crossrange drift of a scatterer to be less than a nominal crossrange resolution cell, expressed by the leading term of (6) as $$(2/\lambda)(P^2 Z/v^2)\Theta < 1/\Theta \qquad (10)$$

where Z is the largest value of $|z|$ on the target. That is, Z is the largest separation between the along-trajectory projections of target points and the along-trajectory projection of the compensated point. For a compensation point that is close to the target, Z is on the order of the target's range extent.

Solving (10) for $\Theta$ gives $$\Theta < \sqrt{\lambda v^2/(2ZP^2)} \qquad (11)$$

By (6), the corresponding crossrange resolution X in $\rho^2$ is given by $$X > \sqrt{2\lambda ZP^2} = C\sqrt{-Z/vt} \qquad (12)$$

Hence, crossrange resolution in $\rho^2$ provided by the invention is finer than that of the straightforward approach (no resampling) by the factor of $\sqrt{-vt/Z}$. This factor is the square root of the ratio of the range and the range extent of the imaged region, which is substantial. Note that the reciprocal-range resampling effectively increases the allowable integration interval by the same factor, from T to $(\Theta/\theta)t = \Theta t^2 = T\sqrt{-vt/Z}$. Consequently, reciprocal-range resampling improves the resolution of each Doppler cell by the same factor. As discussed below, the preferred embodiment follows reciprocal-range resampling with a range-dependent resampling, which increases this factor to the square root of the ratio of the range and the range resolution cell.

Improved Response Compression

During the longer integration interval enabled by reciprocal-range resampling, scatterers may drift through range resolution cells, with the drift increasing with the distance of the scatterer from the radar trajectory. The range drift of a scatterer, even at constant range-rate $\partial R_c/\partial \theta$ with respect to the new reciprocal-range coordinate, will also broaden the scatterer's image response in crossrange. The linear (in reciprocal-range) component of the drift and the consequent response broadening in range and crossrange can be eliminated by the application of keystone processing. (See Perry, R. P., et al., "SAR Imaging of Moving Targets", *IEEE Trans. AES*, January 1999, pp. 188-200.) Keystone processing may be implemented by defining a new coordinate $\theta' = (f/f_c)\theta$ at each sampled frequency f of the radar bandwidth, where $f_c$ is the radar carrier frequency, and then resampling the data to obtain samples spaced evenly in the new coordinate.

Rather than implementing a resampling from the original data sample spacing to even spacing in the reciprocal-range coordinate $\theta$ and a subsequent resampling to even spacing in the keystoned coordinate $\theta'$, the preferred embodiment of the invention is to implement a single resampling from the original data to the keystoned coordinate.

The joint reciprocal-range/keystone resampling generates a rectangular grid of data points with uniform spacing in each of the coordinates of reciprocal-range and instantaneous radar frequency. At each sample in reciprocal-range, one generates a range profile by taking an FFT over the sampled instantaneous frequencies. The phase of each scatterer within its range cell, over a sequence of range profiles, is given by $$\Phi = \frac{4\pi f_c R_c}{c} = \frac{4\pi f_c}{c}[z - \theta' \rho^2/v - \theta'^2 \rho^2 z/(2v^2)] = \qquad (13)$$

$$\frac{4\pi f_c}{c}[z - (\theta' + \theta'^2 z/v)\rho^2/(2v)]$$

where c is the speed of light. Defining a new range-dependent coordinate $\mu = \theta'(1 + \theta' z/v)$ and resampling the data in each range gate to even spacing in the new coordinate gives a phase of $$\Phi = \frac{4\pi f_c}{c}[z - \mu \rho^2/(2v)] \qquad (14)$$

This is linear in the new coordinate, so taking an FFT over the samples in each range gate (thereby generating a range/crossrange image) produces compressed image responses. For applications in which the platform speed changes (unlike the exemplary embodiment), the speed v used in the definition of the new range-dependent coordinate is given by the average speed over the imaging interval.

Measurement of Scatterer Position

The position of each scatterer along the trajectory and its distance from the trajectory can be calculated from the crossrange and range position of the scatterer's image response. Let $t_S$ and $t_E = t_S + T$ denote the start and end imaging times (of the data after resampling, which trims some samples from each end). Then, the crossrange resolution cells are spaced in $1/\theta$ by $1/(1/t_E - 1/t_S) = -t_S t_E/T$. That is, the spacing in $\partial R/\partial \theta$ is $(\lambda/2)(t_S t_E/T)$. Letting $C_k$ and $R_k$ denote the image crossrange and range positions (in resolution cells) of response k, (5) and (6) relate these to the position along the trajectory $z_k$ and the distance from the trajectory $\rho_k$ as $$\frac{cR_k}{2B} \approx z_k - \frac{\bar{\theta}\rho_k^2}{2v^2} \quad (15)$$

and $$\frac{\lambda t_S t_E C_k}{2T} \approx -\frac{\rho_k^2}{2v} - \frac{\bar{\theta}\rho_k^2 z_k}{v^2} \quad (16)$$

where B is the bandwidth of the radar and $\bar{\theta}$ is the mean value of $\theta$. Using (15) to replace $z_k$ in (16) gives a quadratic equation for $\rho_k^2$. Once this is solved, (15) gives the solution for $z_k$. That is, the solution of (15) and (16) gives measurements of the position of the scatterer along the trajectory and its distance from the trajectory.

In a monopulse or interferometric radar system, the processing described herein may be applied to each receiver channel and they may be combined via conventional processing (e.g., amplitude-amplitude monopulse, phase-phase monopulse, sum-and-difference monopulse, combination monopulse; additive interferometry, multiplicative interferometry) to measure the physical position of each image response. The better resolution and compression provided by the invention will result in improved accuracy for these systems. The improved accuracy of the physical position determined by monopulse or interferometry, as well as that of the two-dimensional position $(z_k, \rho_k)$ calculated from the image response location, increases the efficacy of using inconsistency in the two measurements to recognize responses from multipath reflection or rotating objects.

Moving Targets

The image of a moving target appears smeared and shifted if the moving target is treated as a stationary target, per the exemplary embodiment. Entirely analogous effects are well known for side-looking SAR. (See Soumekh, M., *Synthetic Aperture Radar Signal Processing with MATLAB Algorithms*, John Wiley & Sons, 1999; and Soumekh, M., *Fourier Array Imaging*, Prentice Hall, 1994.) If the target moves with a constant velocity relative to the ground at a much slower speed than the radar, response smearing is small for both side-looking SAR and the exemplary embodiment. For the latter, this is because both the reciprocal-range resampling and the keystone resampling of the exemplary embodiment apply to the moving target. Hence, the phase of each scatterer is given by (13) where v is the speed of the radar relative to the moving target. If we apply the range-dependent resampling using the speed of the radar relative to the ground, we obtain a small error for the moving target, causing a small degree of smearing. The difference in speed also translates the image of the moving target in crossrange, away from that of the underlying ground. Because the crossrange position of the moving target includes this unknown translation, corresponding to the unknown difference in speed, (16) cannot be used to determine the distance of each scatterer from the radar trajectory.

The physical position of each scatterer may be determined by monopulse or interferometric processing.

When the signal-to-clutter ratio (SCR) of a moving target is high, an alternative embodiment is preferred. Under these conditions, the radar can directly measure the range to the target and the relative speed of the radar and target. The measured speed is used in (13) through (16). This yields better-focused responses and more accurate measurements of scatterer positions. The alternative embodiment provides the same degree of focus for a target moving at constant velocity as the exemplary embodiment does for a stationary target (the two embodiments are equivalent in the target rest frames). The better-focused responses of this embodiment enable more accurate measurements of physical positions via monopulse or interferometric processing.

When the SCR of a moving target is low, an embodiment combining the other two is preferred. After the reciprocal-range and keystone resamplings, the data are stored. A copy is processed per the exemplary embodiment (range-dependent resampling using the ground-speed of the radar, followed by image formation) and the crossrange (Doppler) position of the moving target is measured, providing the relative speed of the radar and the moving target. A second copy of the data is processed using the measured relative speed in both the range-dependent resampling and the measurement of scatterer position.

Bistatic Embodiment

The exemplary embodiment above is monostatic, with the radar transmitter and receiver on the same platform. An alternative bistatic embodiment, with the transmitter and receiver on separate platforms, employs the same processing wherein range and relative speed are those between the radar receiver and the target, except for the measurement of scatterer position. For the bistatic embodiment, $C_k$ and $R_k$ in (15) and (16) denote twice the image crossrange and range positions (in resolution cells) of response k, respectively.

Illustration of Invention

To illustrate the invention, specific parameters of the exemplary embodiment will be chosen and the radar returns and their processing will be simulated. The illustration simulates the returns from five point scatterers at the corners and center of a horizontal square 10 m on a side, plus a sixth point scatterer above the center and separated from it by the same distance as the corners. The radar travels 0.15 seconds at a speed of 600 m/s and a descent angle of 30°, covering the range interval from 155 m to 65 m, with the impact point being one corner of the square. The square is positioned so that the impact point, the center of the square, and the corner opposite the impact point are at the same projected position along the radar trajectory. The radar has a carrier frequency of 35 GHz, a bandwidth of 1 GHz, and an LFM waveform.

Figure 2:
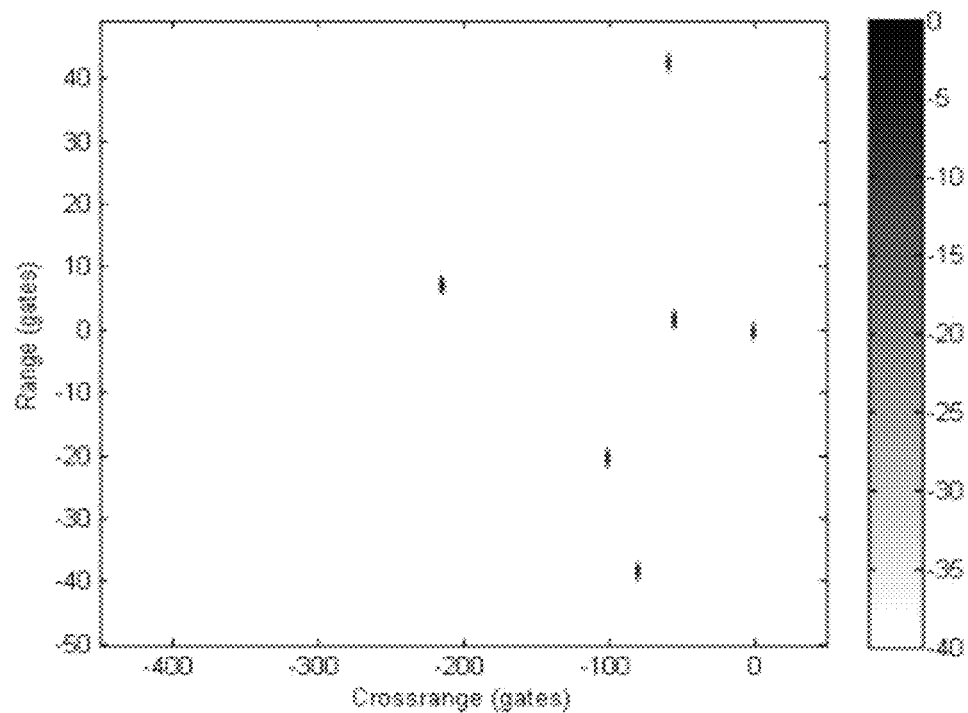
FIG. 2 illustrates an exemplary image formed with the invention, with well-compressed responses throughout the image.

FIG. 1 illustrates the poor focus when an image is formed without resampling the received radar data and FIG. 2 shows the improvement via the present invention. Both figures display grayscale imagery, with black signifying the strongest response and white signifying a cross-section more than 40 dB weaker than that of the strongest response. The compensated response, at the origin in range and crossrange, shows the range and crossrange extents of a well-focused response. The other responses of FIG. 1 have much wider extents, by more than a factor of 100 for the widest. In a less sparse scene, this degree of spreading would preclude any measurement. In FIG. 2, the six responses are all well-compressed, with the widest being only 7% wider than the ideal point target response. Applying (15) and (16) to the response locations gives the scatterer positions along the trajectory and the scatterer distances from the trajectory with an accuracy of a few centimeters (relative to the nominal range resolution cell of 15 cm).

Although FIG. 2 shows a plot of the image produced by the present invention, implementation of the invention does not require any display of the image, which is formed and analyzed digitally.

Implementation

Figure 3:
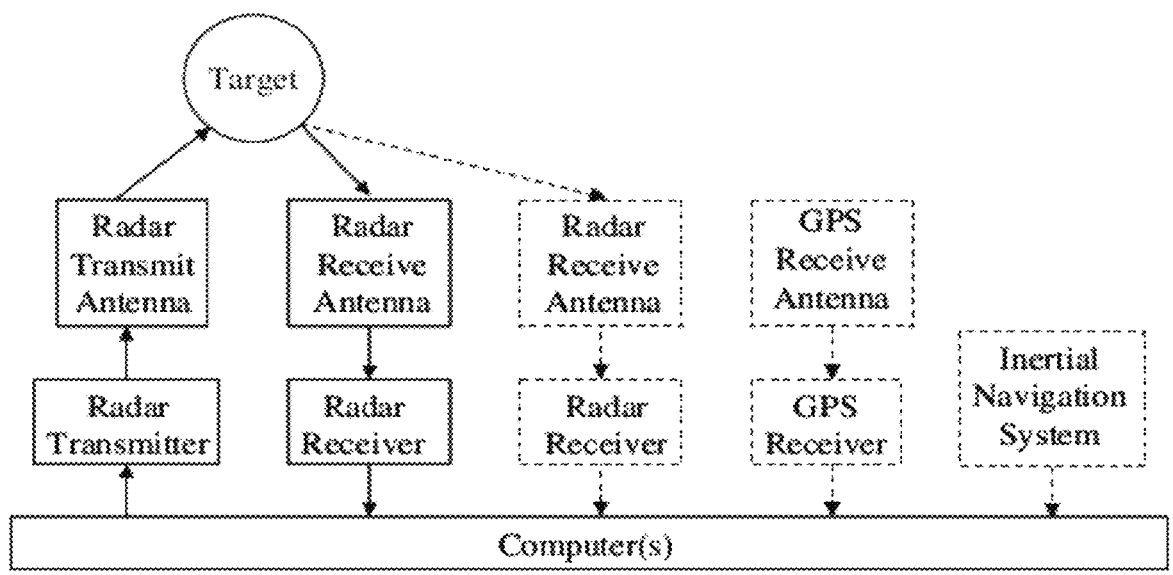
FIG. 3 illustrates a schematic diagram of exemplary system hardware.

FIG. 3 shows a schematic diagram of exemplary hardware for implementing the invention, using separate transmit and receive radar antennas. Necessary elements of the embodiment are shown in solid and optional elements are shown by dashes. Each radar pulse is transmitted, reflects off the target, is received by the radar antenna, and is compressed by the receiver hardware. The spectrum for each pulse is stored in a computer. A monopulse or interferometric system employs multiple receivers, and the output from each receiver is stored separately. Auxiliary information from GPS or INS systems is also stored as it becomes available. Once several radar pulses have been stored, the invention may be applied to the stored data. Although FIG. 3 shows an embodiment with separate transmit and receive antennas, the transmit antenna may also be used on receive. Although FIG. 3 shows an embodiment with common computers for the transmitter and receiver, the computers may also be different.

The exemplary embodiment compensates the motion of the impact point, and defines the reciprocal-range coordinate relative to this point. In general, any point near the radar trajectory may be used for these purposes. The appropriate selection depends on the application. If GPS and INS data are unavailable, the radar itself must provide the range measurements used in resampling, in which case the reference point will likely be off the trajectory. If accurate GPS or INS data are available, a reference point on the trajectory allows a simpler implementation.

Figure 4:
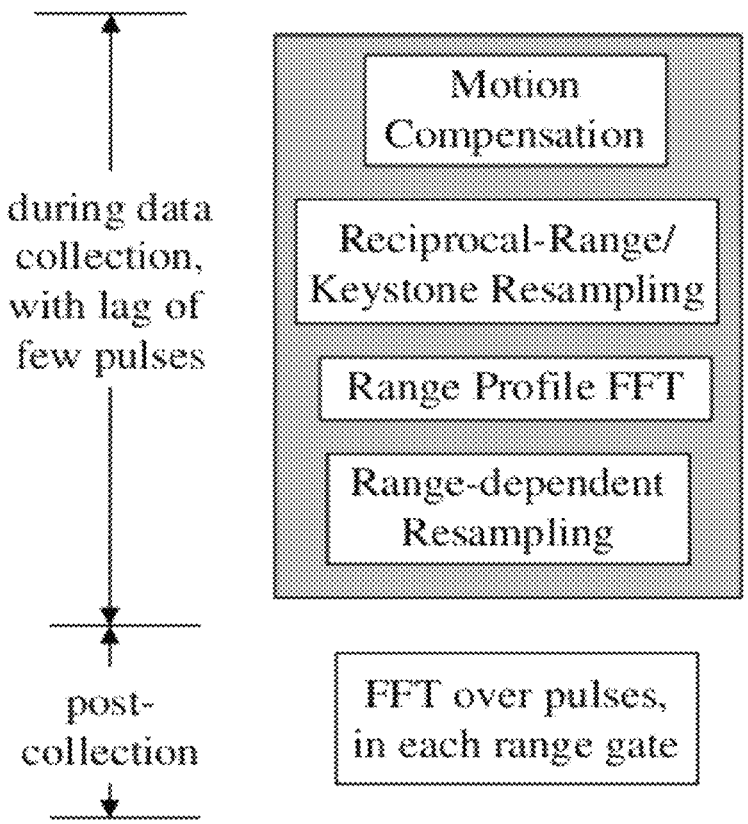
FIG. 4 illustrates the preferred embodiment of image-formation processing.

As shown in FIG. 4, the preferred embodiment of the invention entails performing the resampling as the data are being collected, rather than after all the data have been collected. This pulse-to-pulse processing must operate with a slight lag, as the resampling interpolates between unevenly spaced points and several data samples are needed on each side of an interpolation point for good accuracy. The preferred embodiment utilizes cubic spline interpolation although the embodiment covers other interpolation functions as well. An implementation including range-dependent resampling requires approximately twice the lag as an implementation with just the joint reciprocal-range/keystone resampling, because the range-dependent resampling cannot be done for a pulse until the joint reciprocal-range/keystone processing is complete for that pulse and several later pulses, and a Fourier transform over each of those pulses has generated the corresponding range profile. All the resamplings are one-dimensional, with a correspondingly low computational load, and are readily parallelizable, facilitating real-time implementation. When the radar reaches a predetermined range to the target, which depends on the application, an image is generated from the range profiles by a Fourier transform over the resampled data in each range gate.

Specific Applications

This invention is usable whenever a platform requires awareness of the region toward which it moves. The invention is particularly well-suited to rapidly moving platforms and crowded environments. Specific applications include classification of targets and location of aimpoints by missile-borne and munition-borne fuze radars or radar receivers, obstacle detection for collision avoidance by unmanned airborne systems, and precision approach and landing of aircraft on carriers and on unimproved runways.

While certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. In a radar system, a method of processing returns comprising:
    transmitting a series of radar pulses by a synthetic aperture radar;
    receiving returns from a target;
    defining a new coordinate $\theta=1/t$, where t is time to target impact or closest approach, the time of target impact or closest approach being $t=0$; and
    resampling the returns to obtain constant spacing of the returns in $\theta$ over an integration interval.

2. The method of claim 1 wherein the resampling is done while returns are being received and stored for the same integration interval.

3. The method of claim 1 wherein GPS (the global positioning system) or INS (an inertial navigation system) is used to provide range measurement.

4. The method of claim 1 wherein the radar system is used to provide range measurement.

5. The method of claim 1 wherein separate transmit and receive antennas are used.

6. The method of claim 1 wherein the same antennas are used for transmit and receive.

7. The method of claim 1 wherein the transmit and receive antennas are on separate platforms.

8. The method of claim 1 wherein resampling the stored returns to obtain constant spacing of the returns in $\theta$ includes interpolation between the stored returns to obtain constant spacing of the returns in $\theta$.

9. The method of claim 8 wherein the interpolation is a cubic spline interpolation.

10. The method of claim 1 further comprising:
    applying Keystone processing by using a new coordinate $\theta'=(f/f_c)\theta$ at each sampled frequency f of the radar bandwidth, where $f_c$ is the radar carrier frequency; and
    resampling the resampled returns to obtain samples spaced evenly in the new coordinate $\theta'$.

11. The method of claim 10 wherein resampling the returns to obtain constant spacing of the returns in $\theta$ over an integration interval and resampling the resampled returns to obtain samples spaced evenly in the new coordinate $\theta'$ comprises a single resampling from the returns to the keystoned coordinate by resampling in even increments in $\theta'=(f/f_c)(1/t)$.

12. The method of claim 11 wherein the resampling is done while returns are being received and stored for the same integration interval.

13. The method of claim 11 wherein GPS (the global positioning system) or INS (an inertial navigation system) is used to provide range measurement.

14. The method of claim 11 wherein the radar system is used to provide range measurement.

15. The method of claim 10 further comprising:
    taking a Fourier transform over the samples in each return to generate a set of range profiles defining a series of range gates;
    resampling in each range gate to even spacing in $\mu\equiv\theta'(1+\theta'z/v)$, wherein z is the range in the image and v is the relative speed of the radar and target.

16. The method of claim 15 wherein the resampling is done while returns are being received and stored for the same integration interval.

17. The method of claim 15 wherein the radar is used to directly measure the range to the target and the relative speed v of the radar and target.

18. The method of claim 15 wherein, if the speed of the radar changes, the speed v used in the definition of µ is the average speed over the imaging interval.

19. The method of claim 15 wherein, for a moving target, v is the average speed of the radar relative to the target over the imaging interval.

20. The method of claim 15 further comprising:
taking a Fast Fourier Transform over the samples in each range gate to generate a range/crossrange image with compressed image responses.

21. The method of claim 20 wherein for a stationary or moving target, the physical position of each response is determined by monopulse or interferometer processing.

22. The method of claim 20 wherein the radar system is a multi-channel monopulse or multi-channel interferometric radar system, and the method is applied to each receiver channel.

23. The method of claim 22 wherein the results of the receiver channels are combined by conventional processing selected from the group consisting of amplitude-amplitude monopulse, phase-phase monopulse, sum-and-difference monopulse, combination monopulse, additive interferometry, and multiplicative interferometry, to measure the physical position of each image response.

24. The method of claim 20 further comprising:
calculating the position of each response along the trajectory $z_k$ and its distance from the trajectory $\rho_k$ by solving, for each response k, the following simultaneous approximations:

$$\frac{cR_k}{2B} \approx z_k - \frac{\bar{\theta}\rho_k^2}{2v^2}$$

and $$\frac{\lambda t_S t_E C_k}{2T} \approx -\frac{\rho_k^2}{2v} - \frac{\bar{\theta}\rho_k^2 z_k}{v^2}$$

where:
$C_k$ denotes the monostatic image crossrange position, or twice the bistatic image crossrange position, in resolution cells, of the associated response k;
$R_k$ denotes the monostatic image range position, or twice the bistatic image range position, in resolution cells, of the associated response k;
B is the bandwidth of the radar;
c is the speed of light;
$\bar{\theta}$ is the mean value of θ;
λ is the wavelength corresponding to the carrier frequency of the radar;
$t_S$ denotes the imaging start time t of the data after resampling;
$t_E$ denotes the imaging end time t of the data after resampling; and
$T = t_E - t_S$.

25. The method of claim 24 wherein for each response, the distance of the response from the trajectory $\rho_k$ is first calculated, and then its position along the trajectory $z_k$ is calculated.

26. The method of claim 24 wherein, for a moving target, after obtaining samples spaced evenly in the new coordinate θ', storing the samples in the new coordinate θ';
completing the method using the stored samples in the new coordinate θ' and also using the speed of the radar as the speed v, obtaining the speed of the radar relative to the moving target; and
repeating the completion of the method using the stored samples in the new coordinate θ' and also using the speed of the radar relative to the moving target as the speed v.

27. The method of claim 24 wherein GPS (the global positioning system) or INS (an inertial navigation system) is used to provide range measurement.

28. The method of claim 24 wherein the radar system is used to provide range measurement.

29. The method of claim 24 wherein the same antennas are used for transmit and receive.

30. The method of claim 24 wherein the transmit and receive antennas are on separate platforms.

31. In a radar system, a method of processing returns comprising:
transmitting a series of radar pulses by a synthetic aperture radar;
receiving returns from a target;
applying Joint reciprocal-range/Keystone processing by using a new coordinate θ'=(f/$f_c$)θ at each sampled frequency f of the radar bandwidth, where $f_c$ is the radar carrier frequency, and θ=1/t, where t is time to target impact or closest approach, the time of target impact or closest approach being t=0; and
resampling the returns to obtain constant spacing of the returns in θ' over an integration interval, the resampling being done while returns are being received and stored for the same integration interval.

32. The method of claim 31 further comprising:
taking a Fourier transform over the samples in each return to generate a set of range profiles defining a series of range gates;
resampling in each range gate to even spacing in µ=θ'(1+ θ'z/v), wherein z is the range in the image and v is the relative speed of the radar and target.

33. The method of claim 32 wherein, for a moving target, v is the average speed of the radar relative to the target over the imaging interval.

34. The method of claim 32 further comprising:
taking a Fast Fourier Transform over the samples in each range gate to generate a range/crossrange image with compressed image responses.

35. The method of claim 34 wherein for a stationary or moving target, the physical position of each response is determined by monopulse or interferometer processing.

36. The method of claim 34 further comprising:
calculating the position of each response along the trajectory $z_k$ and its distance from the trajectory $\rho_k$ by solving, for each response k, the following simultaneous approximations:

$$\frac{cR_k}{2B} \approx z_k - \frac{\bar{\theta}\rho_k^2}{2v^2}$$

and $$\frac{\lambda t_S t_E C_k}{2T} \approx -\frac{\rho_k^2}{2v} - \frac{\bar{\theta}\rho_k^2 z_k}{v^2}$$

where:

$C_k$ denotes the monostatic image crossrange position, or twice the bistatic image crossrange position, in resolution cells, of the associated response k;

$R_k$ denotes the monostatic image range position, or twice the bistatic image range position, in resolution cells, of the associated response k;

B is the bandwidth of the radar;

c is the speed of light;

$\bar{\theta}$ is the mean value of $\theta$;

$\lambda$ is the wavelength corresponding to the carrier frequency of the radar;

$t_S$ denotes the imaging start time t of the data after resampling;

$t_E$ denotes the imaging end time t of the data after resampling; and $T = t_E - t_S$.

37. The method of claim 36 wherein, for a moving target, after obtaining samples spaced evenly in the new coordinate $\theta'$, storing the samples in the new coordinate $\theta'$;

completing the method using the stored samples in the new coordinate $\theta'$ and also using the speed of the radar as the speed v, obtaining the speed of the radar relative to the moving target; and repeating the completion of the method using the stored samples in the new coordinate $\theta'$ and also using the speed of the radar relative to the moving target as the speed v.

38. The method of claim 34 wherein the radar system is a multi-channel monopulse or multi-channel interferometric radar system, and the method is applied to each receiver channel.

39. The method of claim 38 wherein the results of the receiver channels are combined by conventional processing selected from the group consisting of amplitude-amplitude monopulse, phase-phase monopulse, sum-and-difference monopulse, combination monopulse, additive interferometry, and multiplicative interferometry, to measure the physical position of each image response.

* * * * *